April 25, 1967 W. B. WHIPPO 3,315,534
LINKAGE
Filed July 16, 1964 2 Sheets-Sheet 1

INVENTOR.
Walter B. Whippo
BY
Gradolph, Love & Rogers
Att'ys

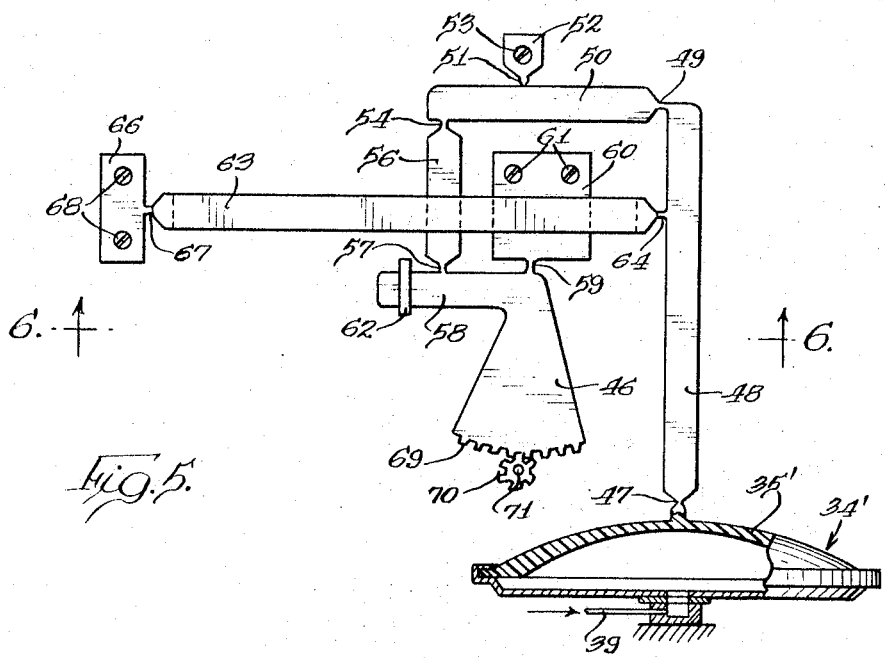
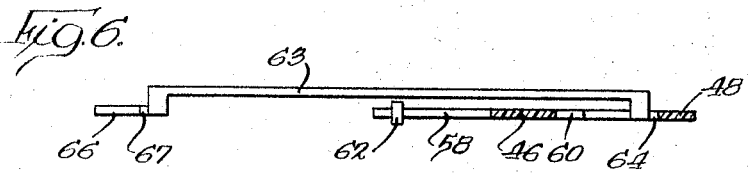
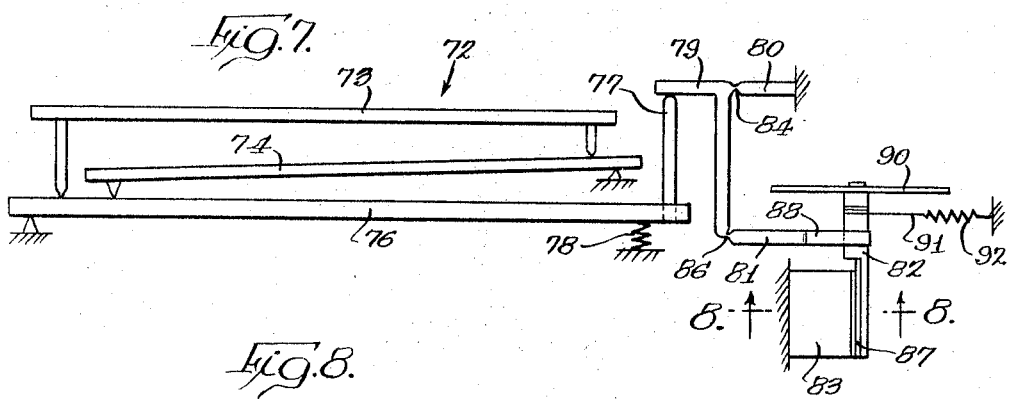
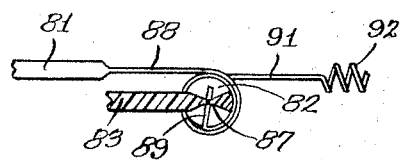

United States Patent Office

3,315,534
Patented Apr. 25, 1967

3,315,534
LINKAGE
Walter B. Whippo, Park Ridge, Ill., assignor to Victor Comptometer Corporation, Chicago, Ill., a corporation of Illinois
Filed July 16, 1964, Ser. No. 383,180
2 Claims. (Cl. 74—89.2)

This invention relates generally to force and motion transmitting devices, and is more particularly concerned with systems for transmitting force and motion through various combinations of integrally connected arms or links.

Conventional mechanical linkage systems in common use for transmitting force and motion between an actuating or input member and a controlled or output member usually comprise a plurality of links, arms and cranks suitably supported and pivotally connected to each other so that force or motion applied to one of such members is transmitted, either in the same or modified form, through the linkage to another member in the linkage train. In such linkages the support pivots and the pivotal connections between the links customarily include pins disposed in bearings or other suitable openings provided or formed in the links and cranks. An inherent disadvantage of such mechanical linkages is the play which always exists to some extent in the pivotal connection, so that a certain amount of lost motion is always present.

The play in such linkages increases as the parts comprising the pivots become worn in use, and such wear is accelerated when corrosion takes place in the pivot portion, or when dust settles therein. The use of corrosion resistant metals, the application of lubricants to the pivotal connections, and means for preventing settling of dust on the linkage components, all tend to reduce the effects above mentioned, but these ameliorative measures are expensive and, furthermore, do not actually eliminate the play which persists in such linkages. Accordingly, linkages having pins or shafts as pivot members are unsuited for uses in which only a negligible amount of play can be tolerated, as in many scientific and highly sensitive industrial instruments.

Objects of the invention are to provide a linkage for transmission of force and motion which may be easily manufactured of readily available materials; which obviates the need for pins, gears, racks and similar connecting members whereby play and backlash are substantially eliminated; which is substantially frictionless and does not require lubrication; and which is unaffected by dust and will not corrode or deteriorate under normal use.

Other objects and advantages of the invention will in part be obvious and will in part be set forth in the following specification.

A linkage capable of providing excellent motion and force transmission, and in which all of the above-mentioned objects are achieved and the foregoing disadvantages avoided, may be provided by fabricating the entire linkage assembly as an integral system, using solid polypropylene as the fabricating material. In such a linkage system, play and lost motion may be entirely eliminated by proper design of the pivot portions connecting the arms or links, and, since the pivot portions are integral with the adjacent links, the pivotal joint is substantially frictionless and thus needs no lubrication, and there can be no harm caused by dust accumulating on the linkage members. Furthermore, polypropylene does not corrode, and formulations thereof with various addition agents may be made for special purposes having such characteristics as high impact strength and stability against the action of heat, aging, and light (including ultra-violet radiation). Thus, the common problems of prior art linkages, associated with corrosion or other deterioration, are avoided, and the useful life of a linkage is greatly increased when its components are made of polypropylene.

All such forms of polypropylene are known in the art—e.g., see U.S. Patent No. 3,108,090—and specific polypropylene formulations having a high degree of toughness and impact strength and exhibiting great resistance to degradation by oxidation, heat, ultra-violet radiation, and weathering are commercially available. Unmodified polypropylene is eminently suitable for use in fabricating the present linkages, and various modified polypropylene formulations, such as those mentioned above, may be used advantageously where the linkage will be subjected to heat, ultra-violet radiation, or other normally deteriorating conditions.

Suitable polypropylenes for use in fabricating the linkages of the present invention are the solid polypropylenes disclosed and claimed in U.S. Patents Nos. 3,112,300 and 3,112,301 to Natta et al., as well as the solid polypropylenes disclosed in the above mentioned U.S. Patent No. 3,108,090.

Examples of many commercial forms of polypropylene are "Moplen" polypropylene, supplied to the industry by Chemore Corporation; "Tenite" polypropylene, supplied by Eastman Chemical Products, Inc.; "Carlona P" polypropylene, supplied by Shell Chemical Company; and "Bakelite" polypropylene supplied by Union Carbide Corporation. The above-named polypropylenes are supplied to the industry in a number of different types for various purposes.

In addition to having the above-mentioned desirable characteristics, all of the commercially available forms of polypropylene, when formed into mechanical parts by molding, extrusion, or other procedures, have the rigidity which renders them eminently suitable for use in linkages for transmitting force and motion, as described above. Experience has taught that all commercial forms of solid polypropylene which are capable of being formed into sheets have the semi-rigid property which characterizes the well-known polypropylene sheets and films of commerce, are suitable for the purpose of this invention.

Examples of specific commercially available forms of the above-mentioned polypropylenes which may be used in the present linkages are "Moplen" polypropylene type A (general purpose), type E (food grade), type C (heat stabilized), type L (ultra-violet stabilized), type AR (flame retardant), and types AH, FH, and AX (high impact); and "Tenite" general purpose formulas 4221, 4231, 4241, and 4251, and high-impact formulas 4B31, 4C31 and 4D31.

Typical properties of "Moplen" polypropylenes are given below in Table 1.

TABLE 1

| Physical Properties | Data | Tets Method* |
|---|---|---|
| General: | | |
| Specific Gravity, g./cc. | 0.902–0.910 | D1505-60T |
| Environmental Stress Cracking | None | Bell Labs |
| Mold Shrinkage, in./in. | 0.015–0.020 | |
| Water Absorption, percent | 0.01 | D570-59AT |
| Mechanical: | | |
| Tensile Strength, p.s.i., 2″/min. | 5,000–6,000 | D638-60T |
| Tensile yield stress, p.s.i., 2″/min. | 4,500–5,500 | D638-60T |
| Ultimate Elongation, percent, 2″/min. | 200 | D638-60T |
| Tensile Yield Strain, percent, 2″/min. | 11–15 | D638-60T |
| Stiffness in Flexure, 125 mil, p.s.i. | 180,000 | D747-58T |
| Izod Impact, ft.-lb./in. of notch | 0.9–1.2 | D256-56 |
| Izod Impact, ft.-lb./in., unnotched | 30 | D256-56 |
| Hardness, Shore D | 75 | |
| Hardness, Rockwell R | 95 | D785-60T |
| Tensile Modulus of Elasticity | 170,000 | D638-60T |
| Thermal: | | |
| Deflection Temperature at 66 p.s.i., Fiber Stress, °F | 220–240 | D648-56 |
| Deflection Temperature at 264 p.s.i., Fiber Stress, °F | 140–150 | D648-56 |
| Coefficient of Linear Thermal Expansion, in./in./°F | 6×10⁻⁵ | D864-52 |
| Coefficient of Thermal conductivity, B.t.u./hr./sq. ft./°F./in. | 1.20 | |
| Specific Heat at 73°F | 0.46 | |
| Vicat Softening Point, °F | 300–310 | D1525-58T |
| Melting Point, °F | 335 | |

* A.S.T.M. method unless otherwise indicated.

Physical properties of some of the "Tenite" injection molded polypropylenes are given below in Table 2.

TABLE 2

| Property Units | ASTM Method¹ | Tenite Polypropylene | | | |
|---|---|---|---|---|---|
| | | General Purpose Formula 4231 | High-Impact Formulas | | |
| | | | 4B31 | 4C31 | 4D31 |
| Flow rate, g./per 10 min. at 230° C. and 2.16 kg. load | *D1238 | 4.5 | 4.5 | 4.5 | 4.5 |
| Density (conditioned), g. per ml | D1505 | 0.91 | 0.91 | 0.91 | 0.91 |
| Softening Point, Vicat, °C | D1525 | 149 | 145 | 140 | 135 |
| Brittleness Temperature, °C | D746 | | 0 | −15 | −40 |
| Tensile Strength at Upper Yield 2 in per min. strain rate, p.s.i. | D638 | 4,900 | 4,400 | 3,700 | 3,300 |
| Stiffness in Flexure, p.s.i.×10⁵ | D747 | 1.5 | 1.4 | 1.2 | 1.0 |
| Rockwell Hardness, R Scale | D785 | 95 | 85 | 65 | 45 |
| Izod Impact Strength at 23° C., ft.-lb/in- of notch | D256 | 0.5 | 1.5 | 2.5 | 15 |
| Izod Impact Strength (unnotched) at 23° C., ft.-lb/in- of width | D256 | >16 | ²NB | ²NB | ²NB |

¹ Unless otherwise noted, all tests are run at 23° C. and 50% relative humidity.
² ⅛-inch specimens did not break using 10 ft.-lb hammer.
*Modified.

Additional suitable commercial polypropylenes include "Tenite" formulas 4B22 and 4D22, which are rubber-modified polypropylenes which, respectively, withstand Standard Izod Impact Tests at −10° F. and −40° F.

Polypropylene is a polymer of the mono-olefin, propylene. Other short chain mono-olefins, such as ethylene, are capable of polymerization into long chain, solid polymer having physical characteristics which make them useful in the manufacture of multiarm, multipivot point unitary linkages as described hereinafter. Long chain solid copolymers of ethylene and propylene are also useful. Eastman Kodak Company has produced a product which it calls a polyallomer and comprises polymerized ethylene and propylene. See Eastman bulletin MB–16A. In its solid state this material provides a practical linkage of the type hereinafter described.

In discussing these polymers of propylene and ethylene herein, the terms used include not only the homopolymers and copolymers, but also such homopolymers and copolymers as modified by the inclusion of these materials, such as fillers, pigments, plasticizers, or other commercial addition agents.

Furthermore, as used herein, the term "polypropylene" is intended to embrace all long chain solid polymers, copolymers, and polyallomers of short chain mono-olefins and of other plastic materials possessing the physical characteristics discussed hereinbefore which are useful in the manufacture of multiarm multipivot point linkags described hereinafter.

Briefly speaking, the improved linkages of this invention comprise a plurality of serially connected arms or links forming an integral assembly and fabricated entirely of solid polypropylene, the junctures between adjacent pairs of links being of relatively reduced cross sectional area when compared to that of the adjacent links, thus forming integral pivot portions serving to connect such adjacent links. The pivot portions afford pivotal action by providing a line or axis of flexure about which the adjacent links are relatively rotatable, and the thickness of the polypropylene material at such flexure axis is substantially less than the corresponding dimension of the respective adjacent links. The thickness of such pivot portions and their length along the pivot axis are of course variable, depending on the forces which the pivot portion is expected to withstand, and in general may be said preferably to be only as large as necessary to provide a cross section sufficient to keep the stress in the pivot portion within a safe working limit. In addition, the thickness and length of the pivot portions should preferably be only as large as necessary to withstand such forces without distortion (other than flexure about the pivot axis) and, when the linkage is formed by molding, only as large as necessary to allow the plastic material to flow in the mold to form a sound molded piece in accordance with the molding procedure used. Generally speaking, the width of such a pivot portion will not be greater than necessary to permit the limited relative rotaion between he connected adjacent links about the axis of the pivot portion and through the desired angle of rotation. If, during such relative rotation of the adjacent links, the links would contact one another and thereby limit the extent of the pivot action undesirably, the links may be tapered or otherwise relieved adjacent the pivot portion to permit the desired greater angular pivot action, as will appear more fully hereinafter. When one of these links or arms is connected to an input element, and another of such arms is connected to an output element, force and motion introduced by the input element is transmitted through the linkage to the output element. Under some circumstances it may be preferable to fabricate either the input element or the output element, or both, integrally with the linkage.

The preferred manner of making the present linkage is by molding the entire assembly of links and connecting pivot portions as a unitary body, as by injection molding, or by vacuum forming. Molding techniques with polypropylenes present no unusual problems, and accordingly, suitable mold design and operation will be readily apparent to those skilled in the art. It may be emphasized here, however, that in injection molding the polypropylene should be injected at one end of the mold so that it flows across all pivot portions to the other end of the mold, which is vented. The plastic material should not be injected so that two cavities will fill at the same time, with the material meeting in the pivot portion, since such a procedure may destroy the integrity of the pivot portion.

After the polypropylene has properly set in the mold, the linkage is preferably removed from the mold while still warm and the several pivot portions flexed by relative movement of the adjacent links about such pivot portions, whereby the molecular chains which comprise the polymerized polypropylene are stress-oriented, and the molded part is then allowed to cool. By such stress-orientation the molecular chains of polypropylene, in the portion of the material stretched during flexing, are aligned parallel to the direction of stretch, which results in greatly increasing the strength of the pivotal joint. Alternative procedures for fabricating the present linkages in appropriate instances are by hot and cold stamping them from polypropylene sheets stock, or by extrusion or machining. In any case, sharp corners and cracks in the pivot portions should be avoided to minimize breakage, and, where small cracks or rough areas occur, these can be smoothed out by flame polishing in known manner.

The invention will now be described in greater detail, reference being had to the accompanying drawings showing a preferred form of linkage adapted to three situations, in which FIG. 1 is a front elevational view of a portion of a conventional air-speed indicator in which the linkage of the present invention are adapted to be used;

FIG. 5 is a plan view, partly in section, of another form of a linkage of the invention, also shown as including a bellows member as an integral component;

FIG. 6 is a cross-sectional view taken on the line 6—6 of FIG. 5, looking in the direction of the arrows;

FIG. 7 is a diagrammatic elevational view of another adaptation of the invention as applied to the platform scale; and FIG. 8 is a horizontal sectional view taken on the line 8—8 of FIG. 7, but on a larger scale, looking in the direction of the arrows.

In the drawings, like reference numerals refer to the same or identical parts.

Figure 1:
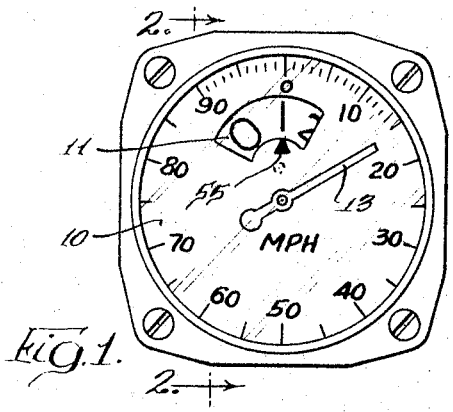

Referring to FIGS. 1–4 for a more particular description of the invention, the air-speed indicator there depicted is provided with a conventional stationary dial portion 10 and a rotatable dial portion 11, and a conventional gear train, indicated generally as 12 (FIG. 2), for actuating the dial 11 and a pointer 13 associated with the stationary dial 10, in response to movement of a pressure-responsive means, later to be described, which is effected by air pressure proportional to the speed of the aircraft through the air.

The gear train 12 comprises a geared sector 14 fast on a rotatable stub shaft 16 journaled in a plate member 17 supported by the instrument housing 18, and the sector 14 engages a pinion 19 which is fast on a rotatable shaft 20 passing through the plate member 17. The shaft 20 is journaled at one end in a plate member 21 which is supported on spacer bushings 15 fixed to the plate 17 by screws 25 (see FIG. 3), and is supported intermediate its ends in a bearing (not shown) in the plate 17. The dial 11 is fixed on the shaft 20 at the free end thereof.

A gear 22, larger than the pinion 19, is fixed on the shaft 20 and meshes with a pinion 23 fixed on a rotatable shaft 24 journaled at one end in the plate 21 and supported intermediate its ends in a bearing 26 in the plate 17. The shaft 24 extends through the plate 17, through a circular arcuate slot (not shown) in the dial 11 and concentrically through the dial member 10, terminating just forward of the dial member 10 and carrying at its free end the pointer 13. The gear ratios between the several geared engagements in the gear train are such that each time the shaft 24 and its pointer 13 move through a full circle, the shaft 20 and its dial 11 move through a much smaller arc, successively bringing the indicia of dial 11 into alignment with the fixed pointer mark 55 on the dial 10, whereby the indicia of the dial 11 indicate a value of miles per hour ten times that of the indicia on the dial 10 indicated by the pointer 13.

Figure 2:
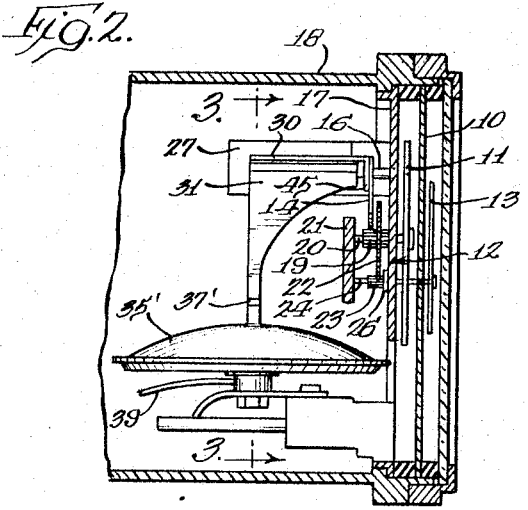
FIG. 2 is a vertical sectional view of the air-speed indicator, taken substantially on the line 2—2 of FIG. 1, but on a somewhat larger scale, looking in the direction of the arrows, and showing a linkage with a bellows portion in accordance with the invention.
Figure 3:
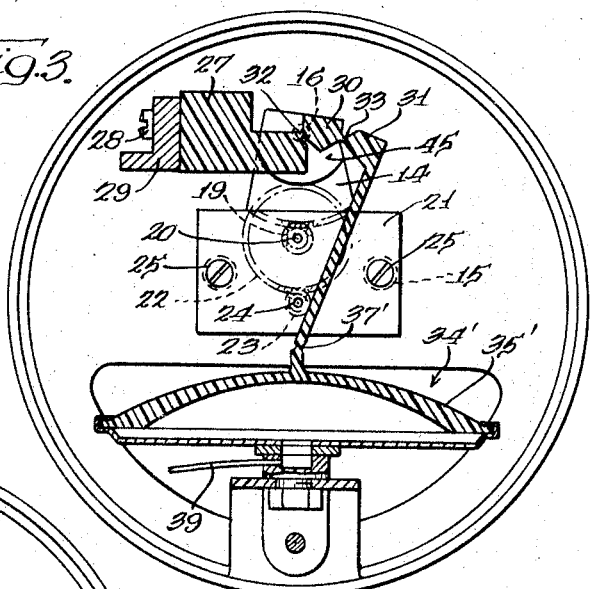
FIG. 3 is a further vertical sectional view, taken on the line 3—3 of FIG. 2, on a larger scale than that of FIG. 2, looking in the direction of the arrows.
Figure 4:
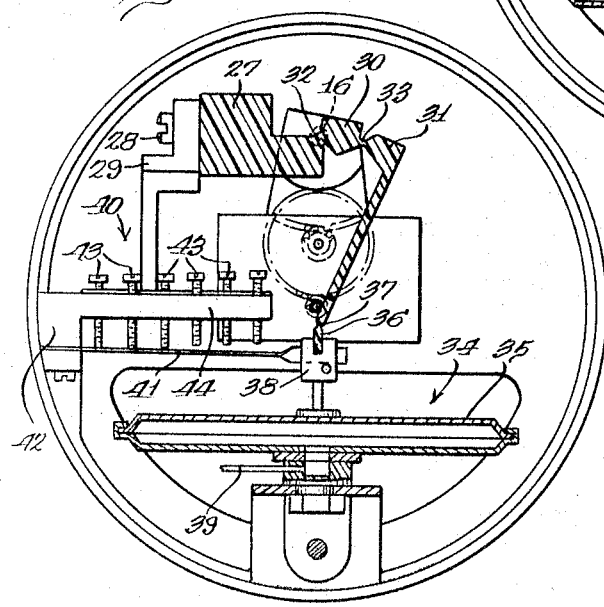
FIG. 4 is a view similar to FIG. 3, showing a linkage of the invention as applied to an air-speed indicator having a conventional metal bellows.

The linkage of the invention shown in FIGS. 2 to 4 comprises a block link 27 of polypropylene fixed by means of screws 28 (only one of which is shown) to a bracket member 29 integral with a portion of the instrument housing. The polypropylene used for the block link 27, and for all other parts mentioned herein as being fabricated of polypropylene, may be any of the polypropylene types referred to hereinabove. Integral with the block 27 is a train of links of polypropylene 30, 31, the link 30 being connected to the block 27 by an integral pivot portion 32, and the link 31 being connected to the link 30 by an integral pivot portion 33, the pivot portions having a substantially reduced cross-sectional area (i.e., having substantially reduced thickness) from that of the adjacent link portions. The link 30 is formed with an integral flange 45 at one end, and the stub shaft 16 is molded integrally on the flange 45 in such a position that the axis of the shaft 16 is coincident with the axis of the pivot portion 32.

The link 31 is connected to a suitable pressure responsive device which translates pressure changes into linear movement, such as a bellows. In FIG. 4, the linkage of the present invention is shown as applied to an air-speed indicator having a conventional metal bellows 34 including an expansible portion 35, and in that embodiment an additional short link 36 of polypropylene is preferably provided, integrally connected to the link 31 by a pivot portion 37 of the same type as the pivot portions 32 and 33, the link 36 being tightly held in a clamping member 38 rigidly attached to the part 35 of the bellows 34 concentrically thereof. A thin copper tubing 39 communicates with the interior of the bellows 34 to transmit thereto air pressure due to speed of the aircraft through the air, in accordance with conventional practice.

Conventional metal bellows of the type shown in FIG. 4 customarily do not expand or contract at a constant rate with changes in air pressure, and to design and construct them for such constant expansion characteristics is much too expensive to permit their use in the ordinary air-speed indicator. Accordingly, when such metal bellows are used, devices for controlling expansion of the bellows are customarily employed, such a device being shown generally at 40 in FIG. 4, and comprising a leaf spring 41, one end of which is firmly secured in a bracket 42 carried by the instrument housing and the other end of which is tightly secured in the clamping member 38 on the bellows. A series of spaced set screws 43, carried by an arm 44 integral with the bracket 42, are adapted selectively to engage the leaf spring at different distances from its point of attachment to the bracket 42, whereby the rate of expansion of the bellows over a wide range of air pressures may be held substantially constant.

When the portion 35 of the bellows is made of polypropylene, and its tapering cross sectional design determined for expanding at a predetermined rate with pressure changes, an indefinite number of such bellows members may be molded at low cost per piece. One such special design is illustrated in FIG. 3 in the bellows 34', and in accordance with the preferred practice the expansible portion 35' thereof is formed of polypropylene integrally with the link 31, providing a corresponding integral pivot portion 37' therefor similar to the portion 37 described above.

In operation of the apparatus of FIGS. 1 to 4, a change in pressure in the bellows 34 or 34', e.g., an increase in the pressure caused by an increase in air speed, causes the bellows member 35 or 35' to rise. Since, as is conventional, the entire linkage is under tension from a spring (not shown) acting on the shaft 24, movement of the bellows member 35 or 35' is followed throughout the linkage with upward movement of the link 31 and counter-clockwise rotational movement of the link 30 and its associated geared sector 14 (FIG. 3) about the coincident axes of their pivot portion 32 and shaft 16. The pinion 19 and gear 22 rotate clockwise on their shaft 20, causing the dial 11 to move clockwise, as viewed in FIG. 3 (counterclockwise in FIG. 1) past the fixed mark 55 on the dial 10. The pinion 23, which is meshed with the gear 22, accordingly rotates counterclockwise as viewed in FIG. 3, but at a much higher speed than the gear 22, on its shaft 24, which moves the rotatable pointer 13 clockwise, as viewed in FIG. 1, past the indicia on the dial 10.

In the embodiment shown in FIGS. 5 and 6, a motion input member, for example a pressure responsive device such as the movable portion 35' of an anchored bellows 34' of the type shown in FIG. 3, is molded of polypropylene integrally with an output member 46 through a series of integrally connected polypropylene link members, the molding operation being performed conveniently in a three-piece injection mold. More specifically, the bellows assembly 34' is fixed by any convenient means in the apparatus in which the linkage is used, and the member 35' of the bellows is connected through a pivot portion 47 to a link 48, which is in turn connected through a pivot portion 49 to a lever arm 50, the latter being fulcrumed on a fixed pivot 51 carried by a member 52 fastened by any convenient means, such as a screw 53, to a stationary part of the apparatus in which the linkage system is used. The lever 50 is connected through a pivot portion 54 to a link 56, the latter in turn being connected through a pivot portion 57 to an arm 58 of the output member 46. Stability of the output member in its plane of rotation is preferably provided by connecting it through another pivot portion 59 to a fastening block 60 which is fixed, for example by screws 61, to a stationary portion of the apparatus (not shown). If desired, a counterweight 62 may be fastened to the arm 58 to neutralize gravitational forces in the plane of movement of the output member 46.

In order further to stabilize the linkage, and to compensate for dimensional changes in the linkage members due to temperature changes, a stabilizing arm 63 is provided which is connected to the link 48 intermediate its pivotal connections 47 and 49, by means of a pivot portion 64, and is connected at its other end to a support member 66 by means of a pivot portion 67. The support member 66 is secured to a stationary portion of the apparatus (not shown) by screws 68.

Although movement of the output member 46 itself may be used to give a measure of the movement of the input member 35', preferably the output member is provided with an integral gear sector 69, which is adapted to engage a pinion 70 of relatively small diameter to magnify the degree of movement associated with movement of the input member 35', and any convenient means, such as a pointer or other indicating device (not shown) may be actuated by the pinion 70 or its shaft 71. The above mentioned pivot portions shown in FIGS. 5 and 6 are of the same type and function in the same way as the pivot portions described in connection with FIGS. 1 to 4.

In operation of the apparatus of FIG. 5, if the pressure in the bellows is increased, for example, the member 35' moves upwardly, as viewed in this figure. Link 48 thus also moves upwardly and rocks and slides the lever 50 about its fulcrum point 51. Such movement of the lever 50 moves the link 56 downwardly and this in turn moves the output member 46 counterclockwise about its pivot portion 59, at the same time driving the output pinion 70 which is connected to any suitable indicating device. If, with changes in temperature, the linkage members expand or contract, the stabilizing arm 63 will expand or contract at the same rate, thereby maintaining constant the desired relationship among the movements of the several links.

In the embodiment of FIGS. 7 and 8, a linkage in accordance with the present invention is illustrated as applied to a platform scale shown diagrammatically and generally as 72, and consisting of a platform 73 and a conventional arrangement of levers 74 and 76 and corresponding fulcrums, the lever 76 carrying at its free end a vertical arm 77. A compression spring 78 supports the free end of the lever 76. The linkage comprises a bell crank 79, a support member 80, a link 81, a spindle 82, and a support member 83 for the spindle. The bell crank 79, support 80, and link 81 are molded of polypropylene as a unitary body, and the spindle 82 and support 83 are likewise molded of polypropylene as a unitary body. The bell crank 79 is connected at its angle to the support member 80 by a pivot portion 84, the end of the bell crank remote from arm 77 is connected to the link 81 by a pivot portion 86, and the bottom of the spindle 82 is connected to the support member 83 by a pivot portion 87, the said pivot portions being molded integrally with the adjacent connected parts and having a substantially reduced cross-sectional area (i.e., a substantially reduced thickness along the pivot line, to provide for the desired pivot action, as described above). The link 81 has a flattened portion 88 at its end remote from the pivot portion 86, and the free end of the flattened portion 88 is fixed to the spindle 82 in a radial slot 89 therein.

An indicator 90 is carried at the top of the spindle 82, and a cable 91, wound around the spindle, is held in slight tension by a tension spring 92, the cable tension thus tending constantly to move the indicator 90 in a direction to indicate increasing weight of an object placed on the platform 73. The limit of such movement of the indicator, however, is determined by the arm 77 which limits counterclockwise movement of the bell-crank 79 about its pivot 84 (FIG. 7), the vertical position of the arm 77 depending on the amount of weight present on the platform 73.

In operation of the embodiment of FIGS. 7 and 8, when an object is placed on the platform 73, the link 76 and its associated arm 77 are depressed against spring 78, causing the bell crank 79 to follow the arm 77 by rotation counterclockwise on its pivot 84 under the action of the tensioned cable 91 coiled around the spindle 82. Such action by the cable on the spindle causes the latter to rotate about its pivot portion 87, thereby moving the indicator 90 in a direction to indicate the weight on the platform 73.

In all of the embodiments of the present linkage described herein, it will be seen that the link portions are tapered adjacent the pivot portions, where necessary, to permit rotation of such links about the adjacent link portion, whereby free pivot action is afforded and undue stress thereon avoided.

While there have been shown and described particular embodiments of the present invention, it will be apparent to those skilled in the art that numerous modifications and variations may be made in the form and construction thereof without departing from the principles of the invention. It is therefore intended, by the following claims, to include within the scope of the invention all such similar and modified forms of the apparatus disclosed by which substantially the results of the invention may be obtained by substantially the same or equivalent means.

What is claimed as new and desired to be secured by United States Letters Patent is:

1. A linkage for conveying motion and force from an input element to an output element which includes a rotatable shaft, comprising a unitary member formed of a plastic material the predominant constituent of which is solid polypropylene, said member having a plurality of arms the cross-sectional area of which is at least adequate to transmit the motion and force from said input element, one of said arms being adapted to be connected to said input element, another of said arms being connected to said output element, and pivot portions connecting adjacent arms comprising said linkage, said pivot portions having substantially reduced thickness compared to the corresponding dimension of the adjacent arms, the molecular chains of the polypropylene comprising said pivot portions being stress-oriented, the said other arm being flattened over a portion of its length opposite its pivot, the end of said flattened portion being connected to said rotatable shaft and wound tightly therearound.

2. A linkage for conveying motion and force from an input element to an output element which includes a rotatable shaft, comprising a unitary member formed of a plastic material the predominant constituent of which is a long molecular chain solid plastic material selected from the group consisting of the homopolymers, copolymers, and polyallomers of short chain mono-olefins, said member having a plurality of arms the cross sectional area of which is at least adequate to transmit the motion and force from said input element, one of said arms being adapted to be connected to said input element, another of said arms being connected to said output element, and pivot portions connecting adjacent arms comprising said linkage, and pivot portions having substantially reduced thickness compared to the corresponding dimension of the adjacent arms, the molecular chains of the plastic material comprising said pivot portions being stress-oriented, the said other arm being flattened over a portion of its length opposite its pivot, the end of said flattened portion being connected to said rotatable shaft and wound tightly therearound.

References Cited by the Examiner

UNITED STATES PATENTS

| 2,565,472 | 8/1951 | Castel et al. | 73—182 |
| 2,706,407 | 4/1955 | Hosford | 73—182 |
| 2,914,089 | 11/1959 | Allinquant | 92—98 X |
| 2,959,194 | 11/1960 | Mercier | 92—98 X |
| 3,240,077 | 3/1966 | Smith | 74—43 |

MILTON KAUFMAN, *Primary Examiner.*

FRED C. MATTERN, *Examiner.*

D. H. THIEL, *Assistant Examiner.*